(12) United States Patent
Kim

(10) Patent No.: US 7,271,872 B2
(45) Date of Patent: Sep. 18, 2007

(54) LIQUID CRYSTAL DISPLAY PANEL DEVICE HAVING COMPENSATION CELL GAP, METHOD OF FABRICATING THE SAME AND METHOD OF USING THE SAME

(75) Inventor: Wan-Soo Kim, Gyeonggi-Do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 211 days.

(21) Appl. No.: 10/308,130

(22) Filed: Dec. 3, 2002

(65) Prior Publication Data

US 2003/0179338 A1  Sep. 25, 2003

(30) Foreign Application Priority Data

Mar. 23, 2002  (JP)  .................... 10-2002-0015869

(51) Int. Cl.
*G02F 1/1339* (2006.01)

(52) U.S. Cl. .................. 349/153; 349/187; 349/190

(58) Field of Classification Search ............... 349/153, 349/154, 187, 189, 190, 156, 160

See application file for complete search history.

(56) References Cited

U.S. PATENT DOCUMENTS

| | | |
|---|---|---|
| 3,978,580 A | 9/1976 | Leupp et al. |
| 4,094,058 A | 6/1978 | Yasutake et al. |
| 4,653,864 A | 3/1987 | Baron et al. |
| 4,691,995 A | 9/1987 | Yamazaki et al. |
| 4,775,225 A | 10/1988 | Tsuboyama et al. |
| 5,247,377 A | 9/1993 | Omeis et al. |
| 5,263,888 A | 11/1993 | Ishihara et al. |
| 5,379,139 A | 1/1995 | Sato et al. |
| 5,406,989 A | 4/1995 | Abe |
| 5,499,128 A | 3/1996 | Hasegawa et al. |
| 5,507,323 A | 4/1996 | Abe |
| 5,511,591 A | 4/1996 | Abe |
| 5,539,545 A | 7/1996 | Shimizu et al. |
| 5,548,429 A | 8/1996 | Tsujita |
| 5,642,214 A | 6/1997 | Ishii et al. |
| 5,680,189 A | 10/1997 | Shimizu et al. |
| 5,742,370 A | 4/1998 | Kim et al. |
| 5,757,451 A | 5/1998 | Miyazaki et al. |
| 5,852,484 A | 12/1998 | Inoue et al. |
| 5,854,664 A | 12/1998 | Inoue et al. |
| 5,861,932 A | 1/1999 | Inata et al. |

(Continued)

FOREIGN PATENT DOCUMENTS

CN  1256431 A  6/2000

(Continued)

*Primary Examiner*—Tarifur R. Chowdhury
*Assistant Examiner*—Tai Duong
(74) *Attorney, Agent, or Firm*—McKenna Long & Aldridge LLP

(57) ABSTRACT

A liquid crystal display panel device includes a liquid crystal display panel, a sealing material disposed along a first outer perimeter of the liquid crystal display panel, a barrier wall disposed along a second outer perimeter of the liquid crystal display panel, and a liquid crystal material disposed within the second outer perimeter of the liquid crystal display panel, wherein the first outer perimeter is greater than the second outer perimeter and at least one cavity space is formed between the first and second outer perimeters.

15 Claims, 4 Drawing Sheets

U.S. PATENT DOCUMENTS

| | | | |
|---|---|---|---|
| 5,875,922 | A | 3/1999 | Chastine et al. |
| 5,952,676 | A | 9/1999 | Sato et al. |
| 5,956,112 | A | 9/1999 | Fujimori et al. |
| 6,001,203 | A | 12/1999 | Yamada et al. |
| 6,011,609 | A | 1/2000 | Kato et al. |
| 6,016,178 | A | 1/2000 | Kataoka et al. |
| 6,016,181 | A | 1/2000 | Shimada |
| 6,055,035 | A | 4/2000 | von Gutfeld et al. |
| 6,163,357 | A | 12/2000 | Nakamura |
| 6,195,142 | B1 * | 2/2001 | Gyotoku et al. ............... 349/69 |
| 6,219,126 | B1 * | 4/2001 | Von Gutfeld ............... 349/153 |
| 6,226,067 | B1 | 5/2001 | Nishiguchi et al. |
| 6,236,445 | B1 | 5/2001 | Foschaar et al. |
| 6,304,306 | B1 | 10/2001 | Shiomi et al. |
| 6,304,311 | B1 | 10/2001 | Egami et al. |
| 6,337,730 | B1 | 1/2002 | Ozaki et al. |
| 6,414,733 | B1 | 7/2002 | Ishikawa et al. |
| 2001/0021000 | A1 | 9/2001 | Egami |
| 2002/0196393 | A1 * | 12/2002 | Tashiro et al. ............... 349/106 |

FOREIGN PATENT DOCUMENTS

| | | |
|---|---|---|
| EP | 1 003 066 | 5/2000 |
| EP | 1 003 066 A1 | 5/2000 |
| JP | 51-65656 | 6/1976 |
| JP | 57-038414 | 3/1982 |
| JP | 57-38414 | 3/1982 |
| JP | 57-088428 | 6/1982 |
| JP | 57-88428 | 6/1982 |
| JP | 58-27126 | 2/1983 |
| JP | 58-027126 | 2/1983 |
| JP | 59-057221 | 4/1984 |
| JP | 59-57221 | 4/1984 |
| JP | 59-195222 | 11/1984 |
| JP | 60-111221 | 6/1985 |
| JP | 60-164723 | 8/1985 |
| JP | 60-217343 | 10/1985 |
| JP | 61-7822 | 1/1986 |
| JP | 61-007822 | 1/1986 |
| JP | 61-55625 | 3/1986 |
| JP | 61-055625 | 3/1986 |
| JP | S62-054225 | 3/1987 |
| JP | S62-054228 | 3/1987 |
| JP | S62-054229 | 3/1987 |
| JP | 62-089025 | 4/1987 |
| JP | 62-89025 | 4/1987 |
| JP | 62-090622 | 4/1987 |
| JP | 62-90622 | 4/1987 |
| JP | 62-205319 | 9/1987 |
| JP | 63-109413 | 5/1988 |
| JP | 63-110425 | 5/1988 |
| JP | 63-128315 | 5/1988 |
| JP | 63-311233 | 12/1988 |
| JP | H03-009549 | 1/1991 |
| JP | H05-036425 | 2/1993 |
| JP | H05-036426 | 2/1993 |
| JP | H05-107533 | 4/1993 |
| JP | 05-127179 | 5/1993 |
| JP | 5-127179 | 5/1993 |
| JP | 05-154923 | 6/1993 |
| JP | 5-154923 | 6/1993 |
| JP | 5-265011 | 10/1993 |
| JP | 05-265011 | 10/1993 |
| JP | 05-281557 | 10/1993 |
| JP | 5-281557 | 10/1993 |
| JP | 05-281562 | 10/1993 |
| JP | 5-281562 | 10/1993 |
| JP | H06-018829 | 1/1994 |
| JP | 06-051256 | 2/1994 |
| JP | 6-51256 | 2/1994 |
| JP | H06-064229 | 3/1994 |
| JP | 6-148657 | 5/1994 |
| JP | 06-148657 | 5/1994 |
| JP | 06-160871 | 6/1994 |
| JP | 6-160871 | 6/1994 |
| JP | H06-194637 | 7/1994 |
| JP | 06-235925 | 8/1994 |
| JP | 6-235925 | 8/1994 |
| JP | 06-265915 | 9/1994 |
| JP | 6-265915 | 9/1994 |
| JP | 6-313870 | 11/1994 |
| JP | 06-313870 | 11/1994 |
| JP | 07-084268 | 3/1995 |
| JP | 7-84268 | 3/1995 |
| JP | 7-128674 | 5/1995 |
| JP | 07-128674 | 5/1995 |
| JP | 07-181507 | 7/1995 |
| JP | 7-181507 | 7/1995 |
| JP | H07-275770 | 10/1995 |
| JP | H07-275771 | 10/1995 |
| JP | H08-076133 | 3/1996 |
| JP | 08-095066 | 4/1996 |
| JP | 8-95066 | 4/1996 |
| JP | 08-101395 | 4/1996 |
| JP | 8-101395 | 4/1996 |
| JP | 8-106101 | 4/1996 |
| JP | 08-106101 | 4/1996 |
| JP | H08-110504 | 4/1996 |
| JP | H08-136937 | 5/1996 |
| JP | 8-171094 | 7/1996 |
| JP | 08-171094 | 7/1996 |
| JP | 08-190099 | 7/1996 |
| JP | 8-190099 | 7/1996 |
| JP | H08-173874 | 7/1996 |
| JP | 8-240807 | 9/1996 |
| JP | 08-240807 | 9/1996 |
| JP | 09-005762 | 1/1997 |
| JP | 9-5762 | 1/1997 |
| JP | 09-026578 | 1/1997 |
| JP | 9-26578 | 1/1997 |
| JP | H09-001026 | 1/1997 |
| JP | 09-311340 | 2/1997 |
| JP | 09-61829 | 3/1997 |
| JP | 9-61829 | 3/1997 |
| JP | 09-073075 | 3/1997 |
| JP | 9-73075 | 3/1997 |
| JP | 09-073096 | 3/1997 |
| JP | 9-73096 | 3/1997 |
| JP | H09-094500 | 4/1997 |
| JP | 9-127528 | 5/1997 |
| JP | 09-127528 | 5/1997 |
| JP | 09-230357 | 9/1997 |
| JP | 9-230357 | 9/1997 |
| JP | 09-281511 | 10/1997 |
| JP | 9-281511 | 10/1997 |
| JP | 9-311340 | 12/1997 |
| JP | 10-123537 | 5/1998 |
| JP | 10-123538 | 5/1998 |
| JP | 10-142616 | 5/1998 |
| JP | 10-177178 | 6/1998 |
| JP | H10-174924 | 6/1998 |
| JP | 10-221700 | 8/1998 |
| JP | 10-282512 | 10/1998 |
| JP | 10-333157 | 12/1998 |
| JP | 10-333159 | 12/1998 |
| JP | 11-014953 | 1/1999 |
| JP | 11-14953 | 1/1999 |
| JP | 11-38424 | 2/1999 |
| JP | 11-038424 | 2/1999 |
| JP | 11-64811 | 3/1999 |
| JP | 11-064811 | 3/1999 |
| JP | 11-109388 | 4/1999 |
| JP | 11-133438 | 5/1999 |
| JP | 11-142864 | 5/1999 |

| | | | | | | |
|---|---|---|---|---|---|---|
| JP | 11-174477 | 7/1999 | | JP | 2001-272640 | 10/2001 |
| JP | 11-212045 | 8/1999 | | JP | 2001-281675 | 10/2001 |
| JP | 11-248930 | 9/1999 | | JP | 2001-281678 | 10/2001 |
| JP | H11-262712 | 9/1999 | | JP | 2001-282126 | 10/2001 |
| JP | H11-264991 | 9/1999 | | JP | 2001-305563 | 10/2001 |
| JP | 11-326922 | 11/1999 | | JP | 2001-330837 | 11/2001 |
| JP | 11-344714 | 12/1999 | | JP | 2001-330840 | 11/2001 |
| JP | 2000-002879 | 1/2000 | | JP | 2001-356353 | 12/2001 |
| JP | 2000-2879 | 1/2000 | | JP | 2001-356354 | 12/2001 |
| JP | 2000-029035 | 1/2000 | | JP | 2002-14360 | 1/2002 |
| JP | 2000-29035 | 1/2000 | | JP | 2002-014360 | 1/2002 |
| JP | 2000-056311 | 2/2000 | | JP | 2002-023176 | 1/2002 |
| JP | 2000-56311 | 2/2000 | | JP | 2002-23176 | 1/2002 |
| JP | 2000-066165 | 3/2000 | | JP | 2002-049045 | 2/2002 |
| JP | 2000-66165 | 3/2000 | | JP | 2002-49045 | 2/2002 |
| JP | 2000-066218 | 3/2000 | | JP | 2002-079160 | 3/2002 |
| JP | 2000-093866 | 4/2000 | | JP | 2002-080321 | 3/2002 |
| JP | 2000-137235 | 5/2000 | | JP | 2002-82340 | 3/2002 |
| JP | 2000-147528 | 5/2000 | | JP | 2002-082340 | 3/2002 |
| JP | 2000-193988 | 7/2000 | | JP | 2002-090759 | 3/2002 |
| JP | 2000-241824 | 9/2000 | | JP | 2002-90759 | 3/2002 |
| JP | 2000-284295 | 10/2000 | | JP | 2002-90760 | 3/2002 |
| JP | 2000-292799 | 10/2000 | | JP | 2002-090760 | 3/2002 |
| JP | 2000-310759 | 11/2000 | | JP | 2002-107740 | 4/2002 |
| JP | 2000-310784 | 11/2000 | | JP | 2002-122870 | 4/2002 |
| JP | 2000-338501 | 12/2000 | | JP | 2002-122872 | 4/2002 |
| JP | 2001-005401 | 1/2001 | | JP | 2002-122873 | 4/2002 |
| JP | 2001-5401 | 1/2001 | | JP | 2002-131762 | 5/2002 |
| JP | 2001-005405 | 1/2001 | | JP | 2002-139734 | 5/2002 |
| JP | 2001-5405 | 1/2001 | | JP | 2002-156518 | 5/2002 |
| JP | 2001-013506 | 1/2001 | | JP | 2002-169166 | 6/2002 |
| JP | 2001-13506 | 1/2001 | | JP | 2002-169167 | 6/2002 |
| JP | 2001-33793 | 2/2001 | | JP | 2002-182222 | 6/2002 |
| JP | 2001-033793 | 2/2001 | | JP | 2002-202512 | 7/2002 |
| JP | 2001-42341 | 2/2001 | | JP | 2002-202514 | 7/2002 |
| JP | 2001-042341 | 2/2001 | | JP | 2002-214626 | 7/2002 |
| JP | 2001-051284 | 2/2001 | | JP | 2002-229042 | 8/2002 |
| JP | 2001-51284 | 2/2001 | | JP | 2002-236276 | 8/2002 |
| JP | 2001-066615 | 3/2001 | | JP | 2002-258299 | 8/2002 |
| JP | 2001-66615 | 3/2001 | | JP | 2002-236292 | 9/2002 |
| JP | 2001-091727 | 4/2001 | | JP | 2002-277865 | 9/2002 |
| JP | 2001-91727 | 4/2001 | | JP | 2002-277866 | 9/2002 |
| JP | 2001-117105 | 4/2001 | | JP | 2002-277881 | 9/2002 |
| JP | 2001-117109 | 4/2001 | | JP | 2002-287156 | 10/2002 |
| JP | 2001-133745 | 5/2001 | | JP | 2002-296605 | 10/2002 |
| JP | 2001-133794 | 5/2001 | | JP | 2002-311438 | 10/2002 |
| JP | 2001-133799 | 5/2001 | | JP | 2002-311440 | 10/2002 |
| JP | 2001-142074 | 5/2001 | | JP | 2002-311442 | 10/2002 |
| JP | 2001-147437 | 5/2001 | | JP | 2002-323687 | 11/2002 |
| JP | 2001-154211 | 6/2001 | | JP | 2002-323694 | 11/2002 |
| JP | 2001-166272 | 6/2001 | | JP | 2002-333628 | 11/2002 |
| JP | 2001-166310 | 6/2001 | | JP | 2002-333635 | 11/2002 |
| JP | 2001-183683 | 7/2001 | | JP | 2002-333843 | 11/2002 |
| JP | 2001-201750 | 7/2001 | | JP | 2002-341329 | 11/2002 |
| JP | 2001-209052 | 8/2001 | | JP | 2002-341355 | 11/2002 |
| JP | 2001-209056 | 8/2001 | | JP | 2002-341356 | 11/2002 |
| JP | 2001-209057 | 8/2001 | | JP | 2002-341357 | 11/2002 |
| JP | 2001-209058 | 8/2001 | | JP | 2002-341358 | 11/2002 |
| JP | 2001-209060 | 8/2001 | | JP | 2002-341359 | 11/2002 |
| JP | 2001-215459 | 8/2001 | | JP | 2002-341362 | 11/2002 |
| JP | 2001-222017 | 8/2001 | | KR | 2000-0035302 | 6/2000 |
| JP | 2001-235758 | 8/2001 | | | | |
| JP | 2001-255542 | 9/2001 | | | | |
| JP | 2001-264782 | 9/2001 | | | | |

* cited by examiner

LIQUID CRYSTAL DISPLAY PANEL DEVICE HAVING COMPENSATION CELL GAP, METHOD OF FABRICATING THE SAME AND METHOD OF USING THE SAME

The present invention claims the benefit of Korean Patent Application No. 15869/2002 filed in Korea on Mar. 23, 2002, which is hereby incorporated by reference.

BACKGROUND OF THE INVENTION

1. Field of the Invention

The present invention relates to a liquid crystal panel, and particularly, to a liquid crystal panel device that prevents over-filling of liquid crystal material.

2. Description of the Background Art

Currently, development of various portable electric devices, such as mobile phones, personal digital assistants (PDA), and notebook computers, has increased. Accordingly, different flat panel display devices such as liquid crystal display (LCD), plasma display panel (PDP), field emission display (FED), and vacuum fluorescent display (VFD) devices are being developed. The LCD devices display information on a screen using refractive anisotropy of liquid crystal material.

FIG. 1 is a cross sectional view of a liquid crystal display device according to the related art. In FIG. 1, a liquid crystal panel 1 comprises a lower substrate 5, an upper substrate 3, and a liquid crystal material layer 7 formed between the lower substrate 5 and the upper substrate 3. The lower substrate 5 is a driving device array substrate, and includes a plurality of pixels (not shown), wherein a driving device, such as a thin film transistor (TFT), is formed on each pixel. The upper substrate 3 is a color filter substrate, and includes a color filter layer (not shown) for reproducing real color. In addition, a pixel electrode (not shown) and a common electrode (not shown) are formed on the lower substrate 5 and the upper substrate 3, respectively. An alignment layer (not shown) is formed on the lower substrate 5 and the upper substrate 3 to uniformly align liquid crystal molecules of the liquid crystal material layer 7.

The lower substrate 5 and the upper substrate 3 are attached by a sealing material 9, and the liquid crystal material layer 7 is formed therebetween. In addition, the liquid crystal molecules are reoriented by the driving device formed on the lower substrate 5 to control the amount of light transmitting through the liquid crystal material layer 7, thereby displaying an image.

Fabrication processes for an LCD device may be divided into a TFT array substrate process for forming the driving device (TFT) on the lower substrate 5, a color filter substrate process for forming the color filter on the upper substrate 3, and a cell formation process. The cell formation process includes attaching the TFT substrate 5 and the color filter substrate 3, forming the liquid crystal material layer 7 therebetween, and treating to this form the liquid crystal display panel 1. Generally, the liquid crystal material layer 7 is formed by a liquid crystal dipping method or by a liquid crystal vacuum injection method. Either one of the liquid crystal dipping method or the liquid crystal vacuum injecting method is performed after the TFT substrate 5 and the color filter substrate 3 are attached and treated.

FIG. 2 is a cross sectional view of a liquid crystal injection process according to the related art. In FIG. 2, a container 12 is filled with the liquid crystal material 14 and is disposed in a vacuum chamber 10, and a portion of a liquid crystal display panel 1 is positioned within the container 12. The vacuum chamber 10 maintains a vacuum pressure by connection to a vacuum pump (not shown). Although it is not shown, a device for moving the liquid crystal display panel 1 is installed within the vacuum chamber 10 to move the liquid crystal display panel 1 from an upper part of the vacuum chamber 10 to the container 12. In addition, an injection hole 16 is formed on the liquid crystal display panel 1 to contact the liquid crystal material 14.

When the vacuum pressure within the chamber 10 is reduced, the injection hole 16 of the liquid crystal display panel 1 is placed into the container 12. Accordingly, the liquid crystal material 14 is injected into the liquid crystal display panel 1 through the injection hole 16 due to a difference between pressure within the liquid crystal display panel 1 and the vacuum pressure of the vacuum chamber 10. The injection hole 16 is sealed using a sealing material after the liquid crystal material 14 is completely filled into the liquid crystal display panel 1, thereby forming the liquid crystal material layer 7 (in FIG. 1).

However, the method of forming a liquid crystal material layer by injecting the liquid crystal material 14 through the injection hole 16 of the liquid crystal display panel 1 in the vacuum chamber 10 may be problematic. First, injection of the liquid crystal material 14 into the liquid crystal display panel 1 may be time consuming. In general, a narrow gap of a few µm is commonly provided between the driving device array substrate and the color filter substrate of the liquid crystal display panel 1 such that a very small amount of liquid crystal material 14 may be injected into the liquid crystal display panel 1 per unit of time. For example, in order to fabricate a 15 inch liquid crystal display panel 1, it takes about 8 hours to completely inject the liquid crystal material 14. Accordingly, the overall fabrication process for making the liquid crystal display panel 1 is increased due to the time for completing the liquid crystal injection process, thereby lowering fabrication efficiency.

Second, consumption of the liquid crystal material is increased as a result of the liquid crystal injection method. For example, a very small amount of the liquid crystal material 14 in the container 12 is actually injected into the liquid crystal display panel 1. In addition, when the liquid crystal material 14 is exposed to an ambient atmosphere or to certain gases, the liquid crystal material 14 deteriorates due to the reaction with the gases. Accordingly, the liquid crystal display panel 1 deteriorates by exposure to impurities within the liquid crystal material 14. Thus, any liquid crystal material 14 remaining in the chamber 12 after the injection process is completed must be discarded, thereby increasing fabrication costs.

One proposed solution to the above problems includes a liquid crystal dropping method for forming the liquid crystal material layer. The liquid crystal dropping method includes procedures for dropping and dispensing the liquid crystal material directly onto a display panel area of a first substrate, thereby uniformly distributing the dropped liquid crystal material across an entire panel area during attachment of a second substrate to the first substrate. Accordingly, the liquid crystal material is directly dropped onto the first substrate during a relatively short amount of time, and thus, the liquid crystal material layer in a large-sized LCD may be rapidly formed.

FIG. 3 is a cross sectional view of a liquid crystal dropping method according to the related art, and FIG. 4 is a plan view of a method for fabricating a liquid crystal material layer using a liquid crystal dropping method according to the related art. In FIG. 3, a drop shaped liquid crystal material 14 is dropped onto a surface of a TFT substrate 5 prior to a bonding process with a color filter substrate 3. The liquid crystal material 14 is dropped by a liquid crystal dispensing apparatus 20, as shown in FIG. 4. Although it is not shown in the figures, a system for controlling a dropping amount of the liquid crystal material 14 is disposed in the liquid crystal dispensing apparatus 20. Accordingly, since the TFT substrate 5 is able to move along x- and y-directions, the liquid crystal material 14 is dispensed at uniform intervals across the surface of the TFT substrate 5.

In FIG. 3, a sealing material 9 is applied along an outer perimeter portion of the color filter substrate 3. Then, the color filter substrate 3 and the TFT substrate 5 are bonded together by pressing the color filter substrate 3 and the TFT substrate 5 together, thereby uniformly distributing the liquid crystal material 14 between the color filter substrate 3 and the TFT substrate 5. Accordingly, one distinguishing characteristic of the liquid crystal dropping method is that the liquid crystal material 14 is dropped onto the surface of the TFT substrate 5 before the liquid crystal display panel 1 is fabricated.

However, the liquid crystal dropping method may be problematic. For example, although a set amount of the liquid crystal material 14 is determined by the liquid crystal dispensing apparatus 20, deviations between the set amount and the amount actually dropped onto the surface of the TFT substrate 5 may occur, thereby causing significant problems. For example, when the actual amount of liquid crystal material 14 is less than the set amount, black brightness during a normally black mode and white brightness during a normally white mode are compromised. Conversely, when the actual amount of the liquid crystal material 14 is greater than the set amount, a gravity failure is generated within the liquid crystal display panel 1. The gravity failure is generated when a volume of the liquid crystal material 14 formed within the liquid crystal display panel 1 increases due to an increase in temperature. Accordingly, a cell gap of the liquid crystal display panel 1 increases by an amount greater than a spacer formed between the color filter substrate 3 and the TFT substrate 5.

SUMMARY OF THE INVENTION

Accordingly, the present invention is directed to a liquid crystal display panel device having a compensation cell gap, a method of fabricating the same, and a method of using the same that substantially obviates one or more of the problems due to limitations and disadvantages of the related art.

An object of the present invention is to provide a liquid crystal display panel device that includes a compensation cell gap for inducing liquid crystal material along an outer portion of the liquid crystal display panel.

Another object of the present invention is to provide a method of fabricating a liquid crystal display panel device that includes a compensation cell gap for inducing liquid crystal material along an outer portion of the liquid crystal display panel.

Another object of the present invention is to provide a method of using a compensation cell gap for inducing liquid crystal material along an outer portion of a liquid crystal display panel.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a liquid crystal display panel device includes a liquid crystal display panel, a sealing material disposed along a first outer perimeter of the liquid crystal display panel, a barrier wall disposed along a second outer perimeter of the liquid crystal display panel, and a liquid crystal material disposed within the second outer perimeter of the liquid crystal display panel, wherein the first outer perimeter is greater than the second outer perimeter and at least one cavity space is formed between the first and second outer perimeters.

In another aspect, a method of fabricating a liquid crystal display panel device, includes forming a sealing material disposed along a first outer perimeter of a liquid crystal display panel, forming a barrier wall along a second outer perimeter of the liquid crystal display panel, and forming a liquid crystal material within the liquid crystal display panel, wherein the first outer perimeter is greater than the second outer perimeter.

In another aspect, a method for compensating for excess amounts of liquid crystal material within a liquid crystal display panel includes determining an actual filling amount of a liquid crystal material to fill the liquid crystal display panel, determining a set amount of the liquid crystal material designed to fill the liquid crystal display panel, comparing the actual filling amount and the set amount, and melting a barrier wall of the liquid crystal display panel based upon the step of comparing.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
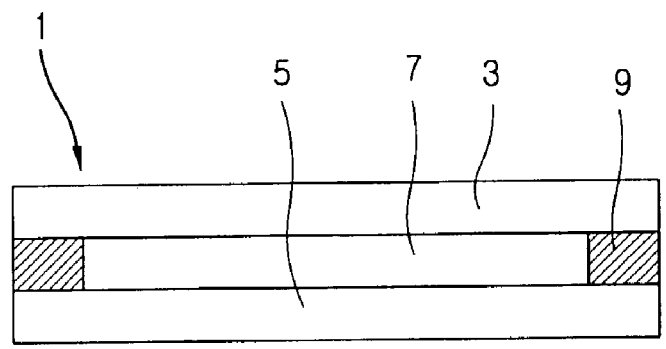
FIG. 1 is a cross sectional view of a liquid crystal display device according to the related art.
Figure 2:
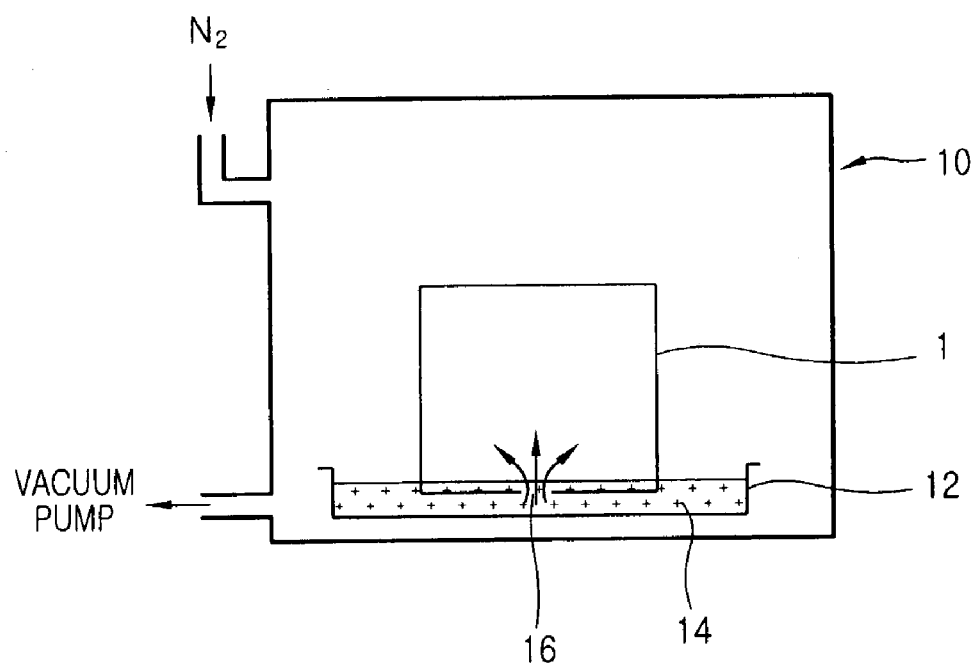
FIG. 2 is a cross sectional view of a liquid crystal injection process according to the related art.
Figure 3:
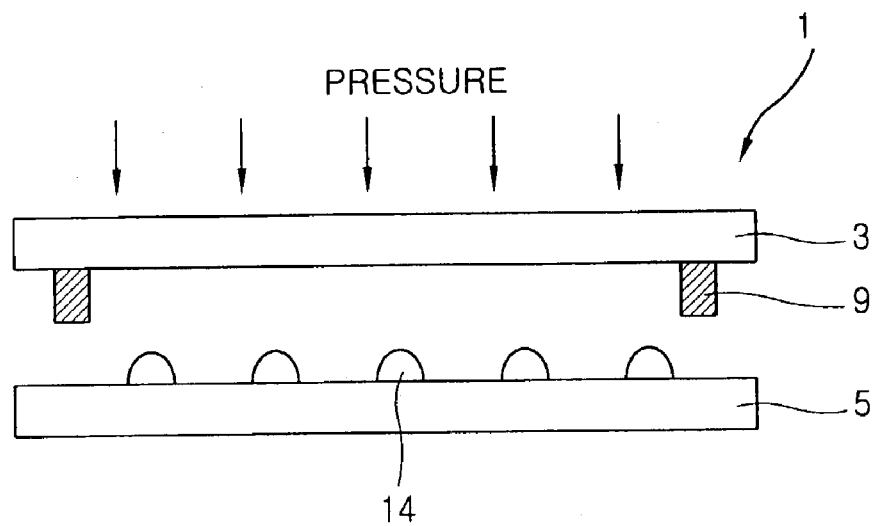
FIG. 3 is a cross sectional view of a liquid crystal dropping method according to the related art.
Figure 4:
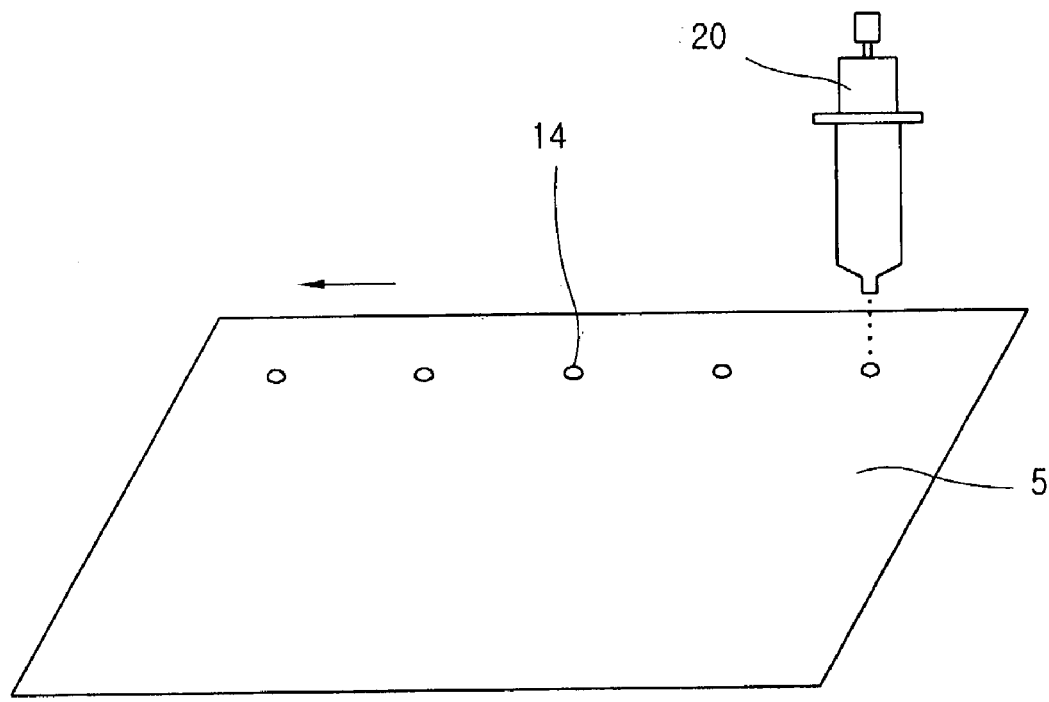
FIG. 4 is a plan view of a method for fabricating a liquid crystal material layer using a liquid crystal dropping method according to the related art.
Figure 5A:
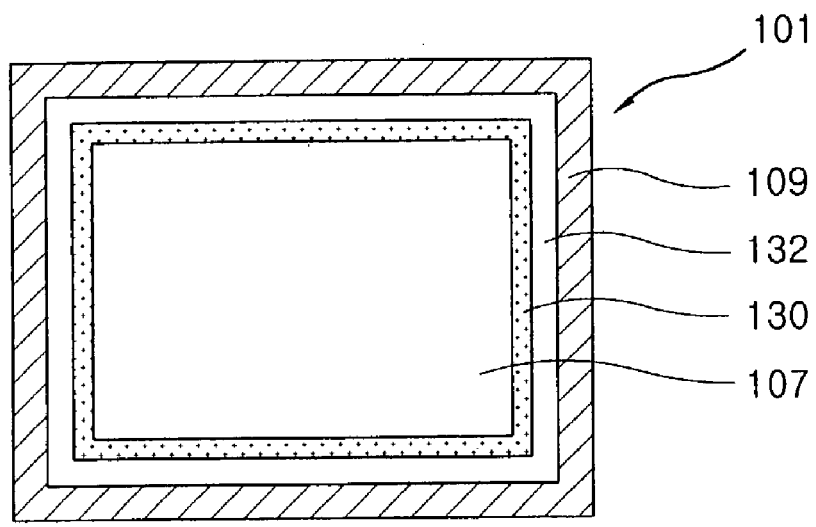
FIG. 5A is a plan view of an exemplary liquid crystal display panel device according to the present invention.
Figure 5B:
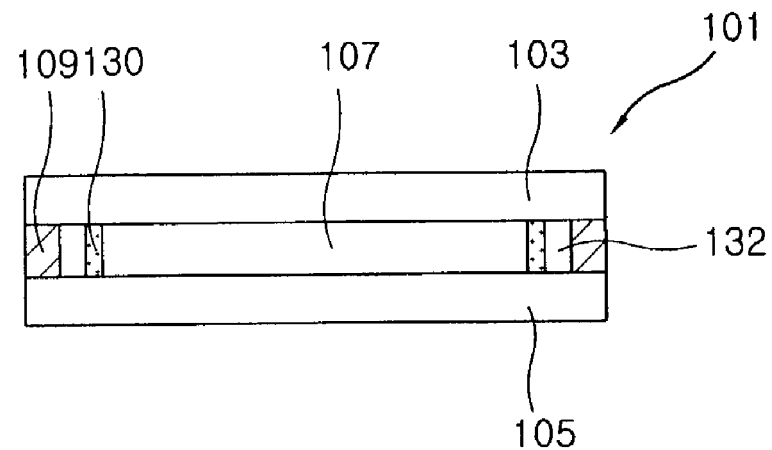
FIG. 5B is a cross sectional view of the exemplary liquid crystal display panel device along I—I of FIG. 5A according to the present invention.

FIG. 5A is a plan view of an exemplary liquid crystal display panel device according to the present invention, and FIG. 5B is a cross sectional view of the exemplary liquid crystal display panel device along I—I of FIG. 5A according to the present invention. In FIGS. 5A and 5B, a liquid crystal display panel device may include a liquid crystal display panel 101 having an upper substrate 103 (i.e., a color filter substrate) and a lower substrate 105 (i.e., a TFT substrate) bonded together by a sealing material 109 applied along a first outer perimeter of the liquid crystal display panel 101. In addition, a barrier wall 130 may be formed along a second outer perimeter portion of the liquid crystal display panel 101 at a position interior to the sealing material 109, wherein the first outer perimeter is greater than the second outer perimeter. Accordingly, the barrier wall 130 and the sealing material 109 may form a continuous cavity space 132 therebetween, and along the perimeter of the liquid crystal display panel 101. Although not shown, the barrier wall 130 may include a plurality of individual walls interior to the sealing material 109. For example, the barrier wall 130 may include an additional barrier wall formed along a third outer perimeter, wherein the third outer perimeter is less than the second outer perimeter. Accordingly, the additional barrier wall 130 and the sealing material 109 may form a second continuous cavity space 132 therebetween, and along the perimeter of the liquid crystal display panel 101. The barrier wall 130 may include a material that may be melted by application of an ultrasonic wave and/or light, such as laser light. An image display area of the liquid crystal display panel 101 may be formed along an inner part of the barrier wall 130 with a liquid crystal material layer 107 formed therein.

Figure 7:
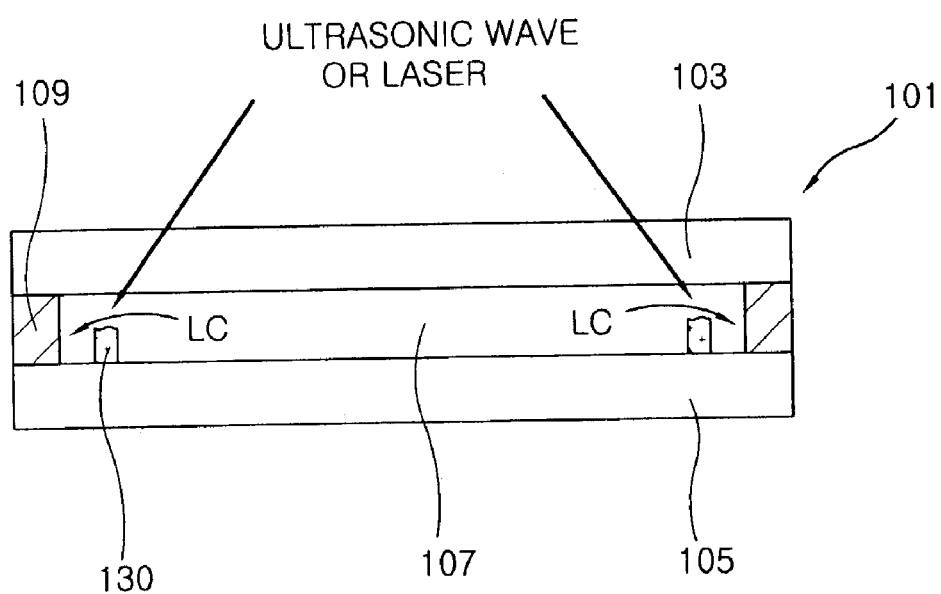
FIG. 7 is a cross sectional view of an exemplary compensation method for excess amounts of liquid crystal material according to the present invention.

If an amount of the liquid crystal material 107 filled within the display area is greater than a set amount, the ultrasonic wave and/or light may be applied from the liquid crystal display panel 101 to the barrier wall 130, as shown in FIG. 7. Accordingly, the barrier wall 130 may be melted by the ultrasonic wave or light to form a passageway for the excess liquid crystal material 107 to flow from the display to the cavity space 132 formed between the barrier wall 130 and the sealing material 109. Thus, the excess liquid crystal material 107 flowing into the cavity space 132 may compensate for any difference between a set amount of liquid crystal material 107 and an amount of liquid crystal material 107 actually deposited onto a surface of the lower substrate 105. Consequently, a cell gap between the upper and lower substrates 103 and 105 may be maintained even when an excess amount of the liquid crystal material 107 is deposited onto a surface of the lower substrate 105.

The cavity space 132 formed between the barrier wall 130 and the sealing material 109 may be relatively small when compared to the display area of the liquid crystal display panel 101. Accordingly, the barrier wall 130 may be formed to have a relatively narrow width when compared to a width of the sealing material 109. Thus, an overall size of the liquid crystal display panel 101 may not be significantly decreased. Conversely, the overall size of the liquid crystal display panel 101 may not need to be increased to accommodate the barrier wall 130.

Figure 6:
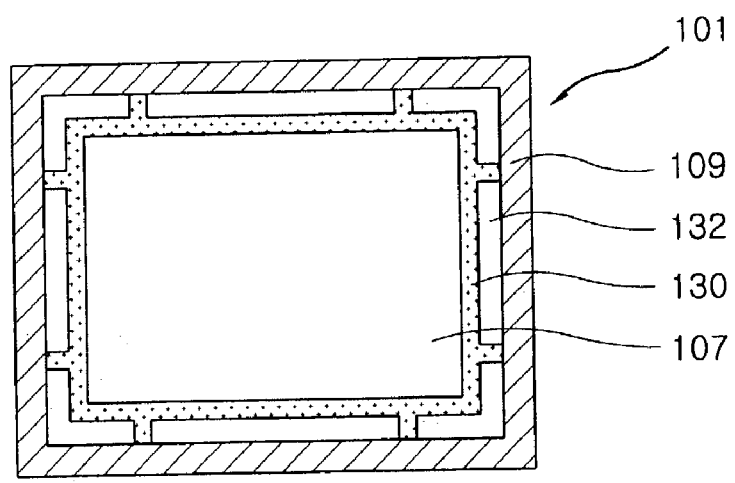
FIG. 6 is a plan view of another exemplary liquid crystal display panel device according to the present invention.

FIG. 6 is a plan view of another exemplary liquid crystal display panel device according to the present invention. In FIG. 6, a liquid crystal display panel device may include a liquid crystal display panel 101 having an upper substrate 103 (i.e., a color filter substrate) and a lower substrate 105 (i.e., a TFT substrate) bonded together by a sealing material 109 applied along an outer perimeter portion of the liquid crystal display panel 101. In addition, a barrier wall 130 may be formed along the outer perimeter portion of the liquid crystal display panel 101 at a position interior to the sealing material 109. Although not shown, the barrier wall 130 may include a plurality of individual walls interior to the sealing material 109. Accordingly, the barrier wall 130 and the sealing material 109 may form a plurality of cavity spaces 132 therebetween, and along the perimeter of the liquid crystal display panel 101. The barrier wall 130 may include a material that may be melted by application of an ultrasonic wave and/or light, such as laser light. An image display area of the liquid crystal display panel 101 may be formed along an inner part of the barrier wall 130 with a liquid crystal material layer 107 formed therein. The barrier wall 130 may be formed on the upper substrate 103 or on the lower substrate 105. Alternatively, the barrier wall 130 may be partially formed on both the upper and lower substrates 103 and 105, respectively.

If an amount of the liquid crystal material 107 filled within the display area is greater than a set amount, the ultrasonic wave and/or light may be applied from the liquid crystal display panel 101 to the barrier wall 130, as shown in FIG. 7. Accordingly, the barrier wall 130 may be melted by the ultrasonic wave or light to form a passageway for the excess liquid crystal material 107 to flow from the display to some of the cavity spaces 132 formed between the barrier wall 130 and the sealing material 109. Thus, the excess liquid crystal material 107 flowing into some of the cavity spaces 132 may compensate for any difference between a set amount of liquid crystal material 107 and an amount of liquid crystal material 107 actually deposited onto a surface of the lower substrate 105. The plurality of cavity spaces 132 may provide for a fine compensation of the excess amount of the liquid crystal material 107. Consequently, a cell gap between the upper and lower substrates 103 and 105 may be maintained even when an excess amount of the liquid crystal material 107 is deposited onto a surface of the lower substrate 105.

FIG. 7 is a cross sectional view of an exemplary compensation method for excess amounts of liquid crystal material according to the present invention. In FIG. 7, the exemplary compensation method may include a step of calculating a compensation amount by comparing an amount of liquid crystal material 107 actually filled within a liquid crystal display panel 101 to a set amount of liquid crystal material 107 designed to fill the liquid crystal display panel 101. The amount of liquid crystal material 107 actually filled within the liquid crystal display panel 101 may be determined by either observing the liquid crystal display panel 101 during inspection or by measuring a cell gap between an upper substrate 103 and a lower substrate 105. Likewise, the set amount of liquid crystal material 107 may be calculated based upon a dispensing device used to dispense the liquid crystal material onto the lower substrate 105. Then, if the comparison results in the actual amount of liquid crystal material 107 exceeding the set amount of liquid crystal material by a predetermined amount, a cavity space 132 (in FIGS. 5A, 5B, and 6) may be opened by exposing a barrier wall 130 to an energy source, such as an ultrasonic wave and/or light. Accordingly, an amount of liquid crystal material 107 may flow from an image display area, which may be formed along an inner part of the barrier wall 130, into the cavity space 132 (in FIGS. 5A, 5B, and 6).

It will be apparent to those skilled in the art that various modifications and variations can be made in the liquid crystal display panel device of the present invention without departing from the spirit or scope of the invention. Thus, it is intended that the present invention cover the modifications and variations of this invention provided they come within the scope of the appended claims and their equivalents.

What is claimed is:

1. A liquid crystal display panel device, comprising:
a liquid crystal display panel;
a sealing material disposed along a first outer perimeter of the liquid crystal display panel;
a removable barrier wall disposed along a second outer perimeter of the liquid crystal display panel; and
a liquid crystal material disposed within the second outer perimeter of the liquid crystal display panel,
wherein the first outer perimeter is greater than the second outer perimeter and at least one cavity space is formed between the first and second outer perimeters.

2. The device according to claim 1, wherein the at least cavity space includes a plurality of cavity spaces.

3. The device according to claim 2, wherein the removable barrier wall includes a plurality lateral portions contacting the sealing material to form the plurality of cavity spaces.

4. The device according to claim 1, wherein the liquid crystal panel includes a first substrate upon which a thin film transistor is formed, and a second substrate upon which a color filter is formed.

5. The device according to claim 4, wherein the sealing material bonds the first substrate to the second substrate.

6. The device according to claim 1, wherein the removable barrier wall includes a material that can be melted by application of an ultrasonic wave to form a passageway into the at least one cavity space.

7. The device according to claim 1, wherein the removable barrier wall includes a material that can be melted by application of light to form a passageway into the at least one cavity space.

8. A method of fabricating a liquid crystal display panel device, comprising steps of:
forming a sealing material disposed along a first outer perimeter of a liquid crystal display panel;
forming a removable barrier wall along a second outer perimeter of the liquid crystal display panel; and
forming a liquid crystal material within the liquid crystal display panel,
wherein the first outer perimeter is greater than the second outer perimeter.

9. The method according to claim 8, further comprising the step of forming at least one cavity space between the first and second outer perimeters.

10. The method according to claim 9, wherein the step of forming at least cavity space includes a step of forming a plurality of cavity spaces.

11. The method according to claim 10, wherein the step of forming a plurality of spaces includes a step of forming a plurality lateral barrier wall portions contacting the sealing material.

12. The method according to claim 8, wherein the liquid crystal panel includes a first substrate upon which a thin film transistor is formed, and a second substrate upon which a color filter is formed.

13. The method according to claim 12, wherein the sealing material bonds the first substrate to the second substrate.

14. The method according to claim 8, wherein the removable barrier wall includes a material that can be melted by application of an ultrasonic wave to form a passageway into the at least one cavity space.

15. The method according to claim 8, wherein the removable barrier wall includes a material that can be melted by application of light to form a passageway into the at least one cavity space.

* * * * *